US006714136B1

(12) United States Patent
Auyang et al.

(10) Patent No.: US 6,714,136 B1
(45) Date of Patent: Mar. 30, 2004

(54) ALARM CLOCK WITH REMOTE CONTROL FUNCTION

(75) Inventors: Bernard Auyang, Mid Levels (HK); Wai-leung Ha, Stanley (HK)

(73) Assignee: Computime, Ltd. (HK)

( * ) Notice: Subject to any disclaimer, the term of this patent is extended or adjusted under 35 U.S.C. 154(b) by 417 days.

(21) Appl. No.: 09/638,336

(22) Filed: Aug. 14, 2000

(51) Int. Cl.[7] .............................................. G05B 19/02

(52) U.S. Cl. ........................... 340/825.24; 340/825.25; 340/5.61; 340/825.29

(58) Field of Search ........................ 340/825.24, 825.72, 340/825.69, 5.61, 5.62, 5.64, 825.25, 825.29; 455/140, 150.1, 352; 348/14.05, 734; 359/142, 146; 341/176, 173; 368/10

(56) References Cited

U.S. PATENT DOCUMENTS 4,850,040 A * 7/1989 Teich et al. ................. 455/603
5,287,109 A * 2/1994 Hesse ......................... 341/176

* cited by examiner

*Primary Examiner*—Michael Horabik
*Assistant Examiner*—Vernal U Brown
(74) *Attorney, Agent, or Firm*—Banner & Witcoff, Ltd.

(57) ABSTRACT

Apparatus providing an alarm clock remote control system and a remote control system with an alarm clock system with alarm clock circuitry that includes: a microprocessor, coupled to the alarm clock activation circuitry, remote IR diode driving circuitry, an internal buzzer, an alarm, a display, and input and output ports, for providing central control; the display, coupled to the microprocessor, for displaying current time and alarm time; a speaker, coupled to the microprocessor, the AM/FM radio unit, the internal buzzer, and the alarm, for outputting selected audio; an AM/FM radio tuner, and clock setup circuitry, alarm setup and activation circuitry coupled to the microprocessor for setting the clock, setting the alarm, and activating at least one remote device; and a programmable universal infrared remote device control, coupled to the alarm clock circuitry, for remote programming a remote device, and having activation circuitry for activating the remote device.

4 Claims, 5 Drawing Sheets

ALARM CLOCK WITH REMOTE CONTROL FUNCTION

FIELD OF THE INVENTION

The present invention relates generally to the field of alarm clocks, and more particularly, to an alarm clock with a universal infrared remote home device controller.

BACKGROUND OF THE INVENTION

Alarm clocks have been used for a long time to awaken sleepers, in particular to help them begin their work days. Alarm clocks coupled with radio functions have been used to awaken people more gently, using music from a favorite radio station. However, the music being played by the radio station may be sleep-inducing, and thus the alarm function may be frustrated. The snooze function may aid in alleviating the problem of waking the sleeper, but sound sleepers may inactive both the clock alarm and the snooze alarm, resulting in the sleeper's oversleeping.

Where the individual has home entertainment devices that he wishes to enjoy until a predetermined bedtime, he would find it beneficial to have a preset time for inactivation of the selected home entertainment device or devices so that he could sleep more comfortably during his normal sleeping time. Though the alarm clock serves as a wake-up assistant for most people, such a device should provide further capabilities for remote home entertainment device management to facilitate everyday living. Thus, there is a need for an alarm clock that may conveniently provide, in addition to alarm clock functions, infrared remote home device management for a plurality of home devices, including entertainment devices.

SUMMARY OF THE INVENTION

The present invention provides an alarm clock remote control system that includes alarm clock circuitry with a microprocessor that is coupled to the alarm clock circuitry, the remote IR diode driving circuitry, an internal buzzer, an alarm, a display, and a plurality of input ports and output ports, and is used for providing central control. The system uses a display for displaying, as selected, a current time or an alarm time. A speaker that is coupled to the microprocessor is also coupled to an AM/FM radio unit, an internal buzzer, and the alarm, and outputs selected audio. An AM/FM radio tuner may be used to tune a radio to a particular station so that it may be activated at a chosen time. Clock setup circuitry, alarm setup and activation circuitry are coupled to the microprocessor and are used for setting the clock, setting the alarm, and activating at least one remote device.

A programmable universal infrared remote device control is coupled to the alarm clock circuitry and may be used for remote programming of at least one remote device. The remote device control includes activation circuitry for activating the at least one remote device. Typically, the display is a light emitting diode or an LCD display. The remote devices activated may be any of a plurality of remote devices that are controllable by the alarm clock remote control system, such as a television, a video cassette recorder, an electronic device tuner, a compact disk player, a video compact disk player, a digital video/versatile disk player, and/or a video cassette recorder. In one embodiment, a remote device setup mode is activated/powered up by pressing the remote power and remote sleep/off buttons simultaneously. A channel increment button, a channel decrement button, a volume increment button and a volume decrement button may be used to provide a predetermined four part code entry that identifies a selected remote device. The selected audio to be output from the speaker may be a ringing alarm, a buzzer output, and/or output of the AM/FM radio unit.

The present invention may also be described as a remote control system that includes an alarm clock system wherein the alarm clock system has a microprocessor, coupled to the alarm clock circuitry, the remote IR diode driving circuitry, an internal buzzer, an alarm, a display, and a plurality of input ports and output ports, for providing central control, the display, coupled to the microprocessor, for displaying at least one of a current time and an alarm time; a speaker, coupled to the microprocessor, the AM/FM radio unit, the internal buzzer, and the alarm, for outputting selected audio, an AM/FM radio tuner, clock setup circuitry, alarm setup and activation circuitry coupled to the microprocessor for setting the clock, setting the alarm, and activating at least one remote device; and a programmable universal infrared remote device control, coupled to the alarm clock circuitry, for remote programming at least one remote device, and having activation circuitry for activating the at least one remote device.

The display for the remote control system is generally a light emitting diode or an LCD display, and the remote device may be any of a plurality of remote devices controllable by the remote control system such as a television, a video cassette recorder, an electronic device tuner, a compact disk player, a video compact disk player, a digital video/versatile disk player, and/or a video cassette recorder. In one embodiment, the remote device setup mode is activated/powered up by pressing the remote power and remote sleep/off buttons simultaneously. A channel increment button, a channel decrement button, a volume increment button and a volume decrement button may be used to provide a predetermined four part code entry that identifies a selected remote device. The selected audio may be a ringing alarm, a buzzer output, or output of the AM/FM radio unit.

In one embodiment, the invention includes a remote control alarm system with a microprocessor/microcontroller, coupled to alarm activation circuitry, a remote controller alarm triggering unit, an alarm, a display, and a plurality of input ports and output ports, for providing central control. The display is coupled to the microprocessor/microcontroller and is used for displaying at least one of a current time and an alarm time. The speaker is coupled to the microprocessor/microcontroller and used for outputting selected audio. The microprocessor/microcontroller, and alarm setup and activation circuitry are coupled to the remote controller alarm triggering unit for setting the alarm, and activating at least one remote device of a plurality of remote devices, wherein, the microprocessor/microcontroller signals the remote controller alarm triggering unit to trigger activation of one of the plurality of remote devices.

DETAILED DESCRIPTION OF PREFERRED EMBODIMENTS

The present invention provides an electronically-operated alarm clock that includes infrared remote control management for a plurality of home devices. The alarm clock typically includes a microprocessor, a display (such as an LED or LCD display), a speaker, an AM/FM radio tuner, clock setup circuitry including an alarm setup and activate circuitry, a programmable universal infrared remote control for at least one device that includes circuitry to activate the remote home device/devices during alarm activation. The Alarm Clock With Remote Control Function, denoted hereafter as Alarm Clock Remote, is an alarm clock with a universal infrared remote controller. The Alarm Clock Remote can function as a universal remote control for one or more remote devices, and also as an alarm clock that can turn on/off the internal alarm and/or radio. The invention can turn on/off at least one specified remote home device such as a television (TV), a video cassette recorder (VCR), an electronic device tuner, a compact disk (CD) player, a video compact disk (VCD) player, a digital video/versatile disk (DVD) player and/or any other home devices remote from the alarm clock, where the home device may accept input from an infrared remote control.

Figure 1:
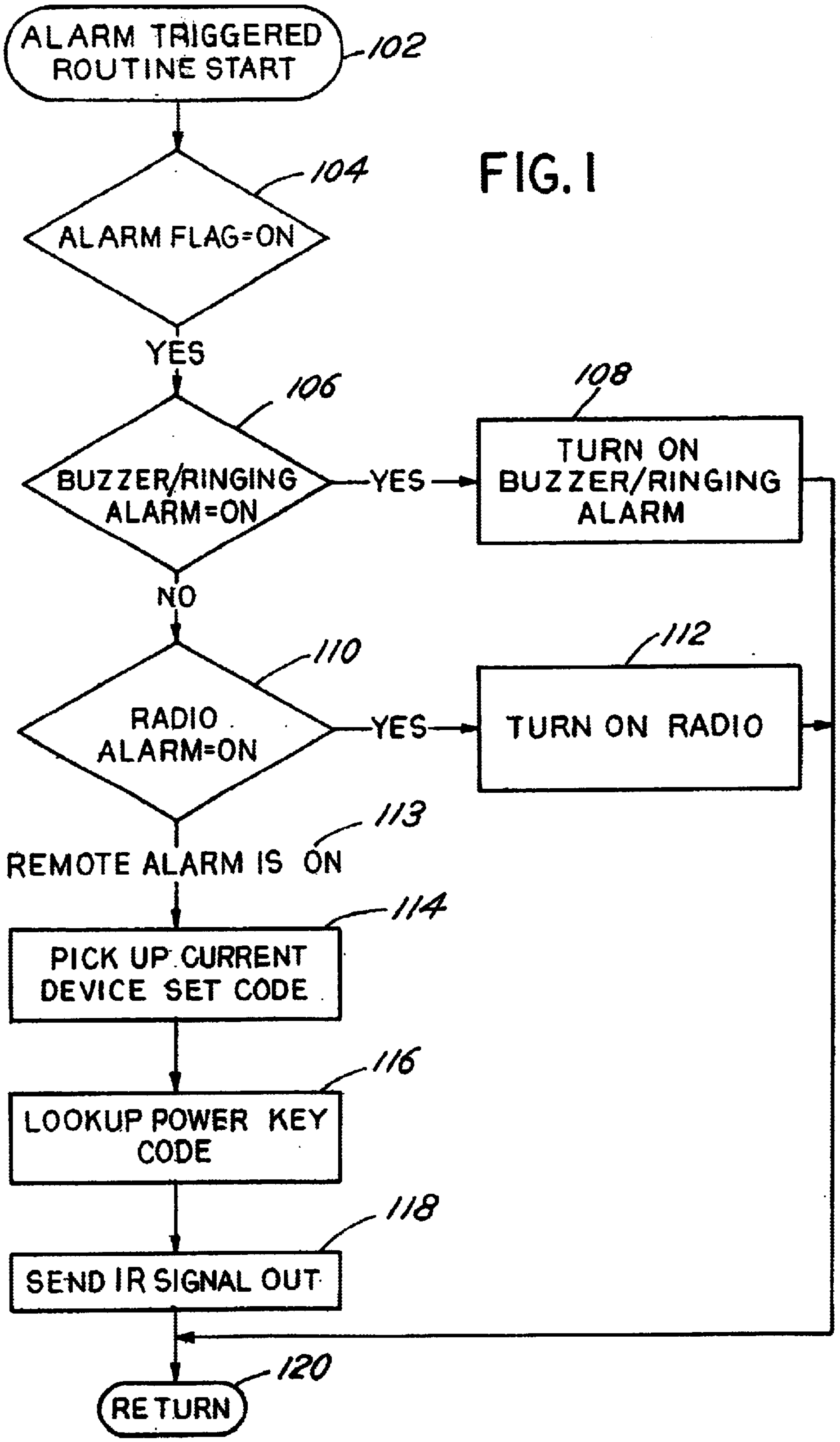
FIG. 1 is a one embodiment of a flow diagram of an alarm ON handling routine in accordance with the present invention.

FIG. 1 is a one embodiment of a flow diagram of steps of an alarm ON handling routine in accordance with the present invention. First, the alarm is switched ON 102. Then, the microprocessor routine checks to see if the alarm flag is in an ON position 104. Where the alarm flag indicates that the alarm is ON, the microprocessor routine checks to determine whether the buzzer/ringing alarm flag is set to ON 106. Where the buzzer/ringing alarm flag is set to ON, the microprocessor turns on the buzzer/alarm 108, and the routine returns 120 to a ready position wherein the routine start may be triggered 102. Where the buzzer/ringing alarm flag fails to be set to ON, the microprocessor determines whether a radio alarm flag is set to ON 110. Where the radio alarm flag is set to ON, the microprocessor turns the radio on 112, then the routine returns 120 to a ready position wherein the routine start may be triggered 102. Where the radio alarm flag fails to be ON, the remote alarm has been set to ON 113. The microprocessor picks up/processes 114 a current device set code that is input by the four buttons: +/− channel, and +/− volume and uses a look-up table 116 to determine which remote device is to be activated. Upon determining the remote device to be activated, the microprocessor sends an infrared signal 118 to the selected remote device to activate it and then the routine returns 120 to a ready position wherein the routine start may be triggered 102.

Figure 2:
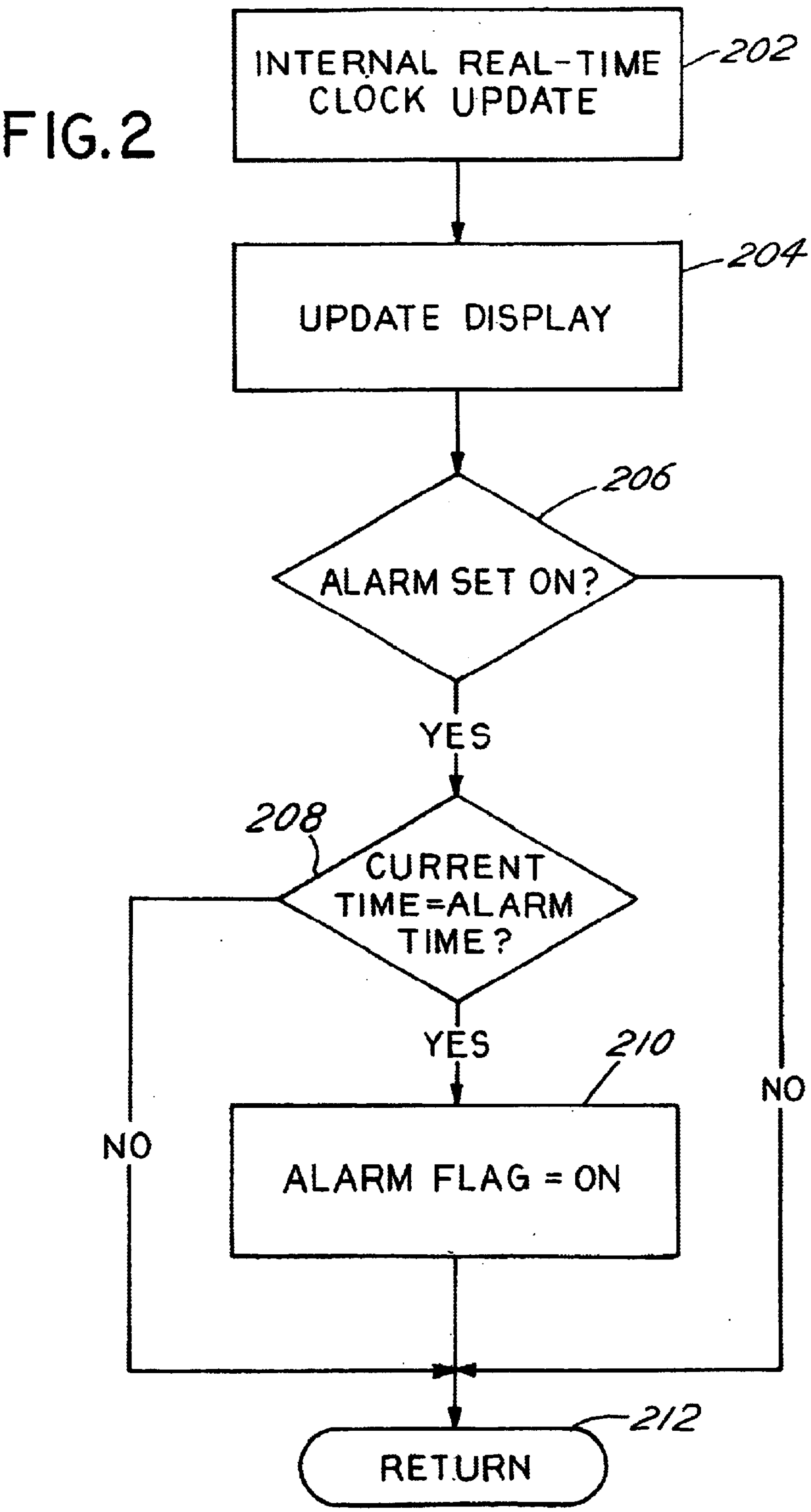
FIG. 2 is one embodiment of a clock checking routine in accordance with the present invention.

FIG. 2 is one embodiment of a clock checking routine which runs every minute in accordance with the present invention. The microprocessor utilizes the internal real-time clock update 202 to determine whether to activate the alarm. An update display is shown 204 on the display unit. The microprocessor checks to see whether the alarm is set to ON 206. Where the alarm fails to be set to ON, the microprocessor proceeds to return 212 to running the internal real-time clock update again. Where the alarm is set to ON, the microprocessor determines whether the current time is the same time as the time set for the alarm to be activated 208. Where the current time fails to be the same time as the time set for the alarm to be activated, the microprocessor proceeds to return 212 to running the internal real-time clock update again. Where the current time is the time set for the alarm to be activated, the microprocessor sets the alarm flag to ON 210, which activates the alarm/buzzer.

Figure 3:
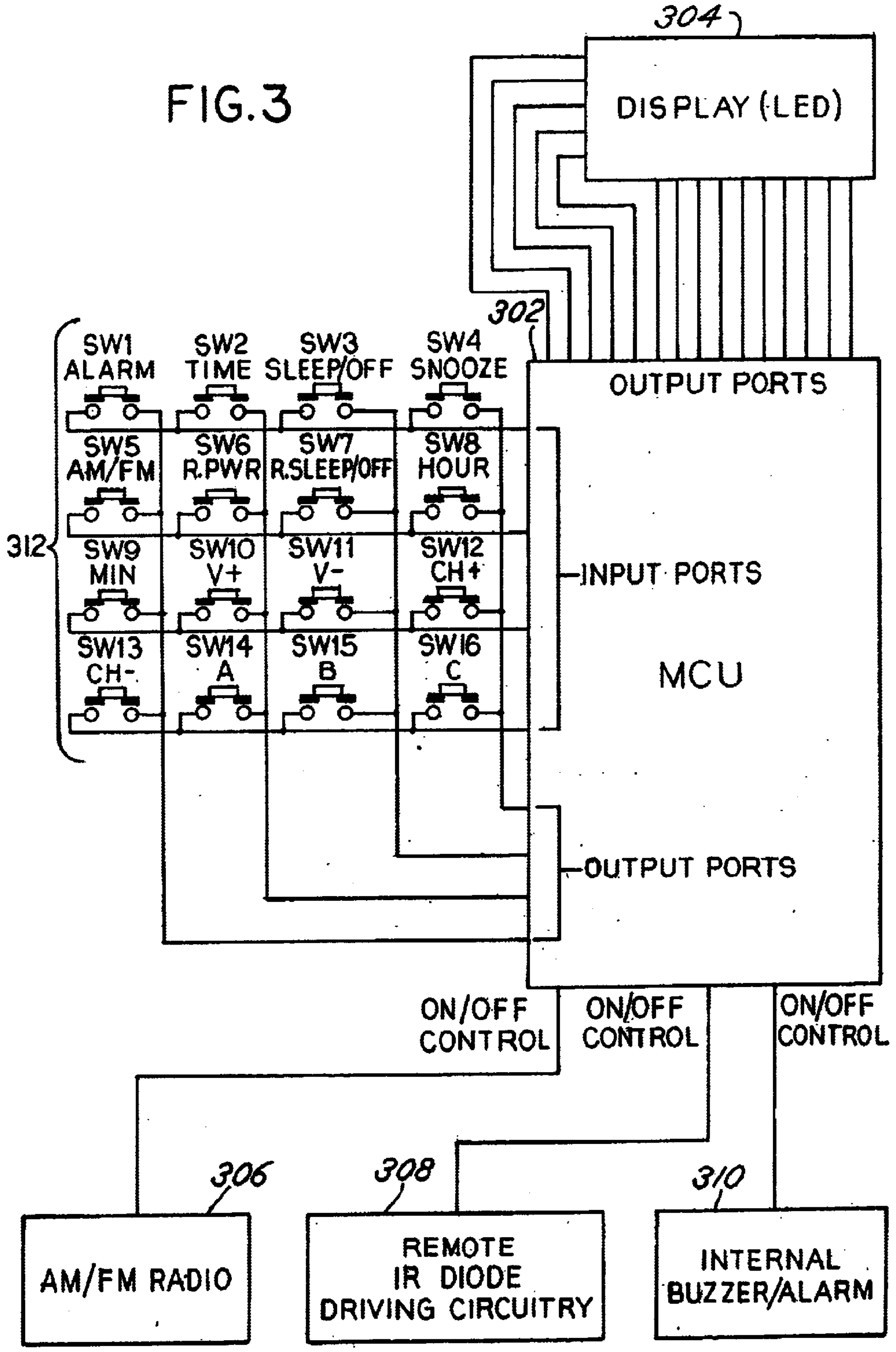
FIG. 3 is a schematic representation of one embodiment of a control switching system with alarm setup and activate circuitry and a programmable universal infrared remote control for at least one remote device with circuitry to activate the remote home device/devices during alarm activation, a display and controlled elements that are coupled to a microprocessor for the alarm clock.

FIG. 3 is a schematic representation of one embodiment of a control switching system with alarm setup and activate circuitry and a programmable universal infrared remote control for at least one remote device with circuitry to activate the remote home device/devices during alarm activation, a display and controlled elements that are coupled to a microprocessor for the alarm clock. The microprocessor unit (MCU) 302 is coupled to a display 304, which may, for example, be an LED display. A plurality of switches 312, which may, for example include an alarm switch SW1, a time switch SW2, a sleep switch SW3, a snooze switch SW4, an AM/FM radio switch SW5, a remote power switch SW6, a remote sleep switch SW7, an hour switch SW8, a minute switch SW9, a volume increment (V+) switch SW10, a volume decrement (V−) switch SW11, a channel increment (Ch+) switch SW12, a channel decrement (Ch−) switch SW13, a first switch A for a first selectable remote device SW14, a second switch B for a second selectable remote device SW15, and a third switch C for a third selectable remote device SW16. Clearly, many other configurations of switches may be used. The desired switches may be selected to activate/deactivate or increment/decrement settings and devices as selected. Each of the plurality of switches is configured to have an input port to receive signals from the MCU and an output port to provide output signals to the MCU 302. In accordance with the switch activated, the MCU 302 sends ON/OFF control signals to the AM/FM radio 306, the remote IR diode circuitry 308 or the internal buzzer/alarm 310.

Figure 4:
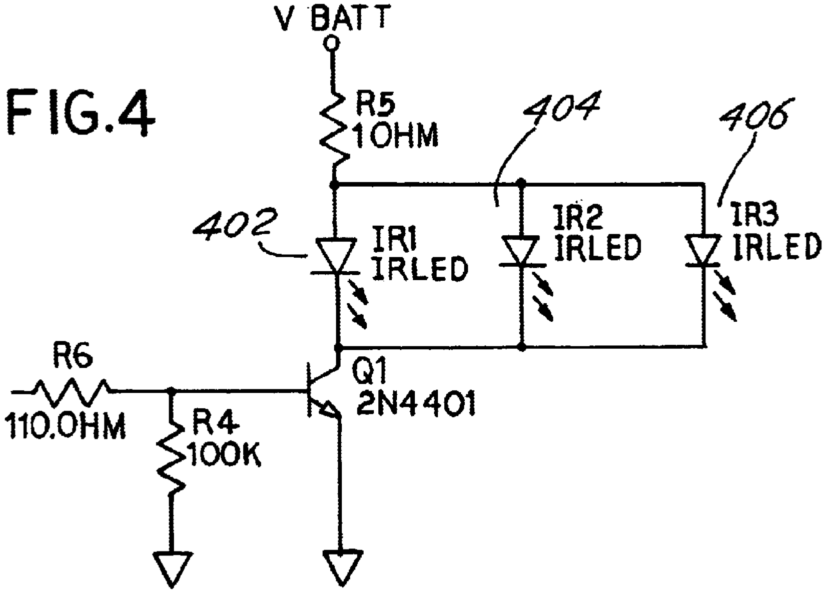
FIG. 4 is a schematic representation of one embodiment of an infrared diode driving circuitry in accordance with the present invention.

FIG. 4 is a schematic representation of one embodiment of an infrared diode driving circuitry 308 in accordance with the present invention. Upon receiving an ON/OFF control signal from the MCU 302, the remote IR diode driving circuitry activates the IR1 402, IR2 404 and/or IR3 406 LEDs in accordance with a predetermined scheme that sends an infrared signal to the remote device selected via the four buttons: Channel+(channel increment button), Channel−(channel decrement button), Volume+(volume increment button) and Volume−(volume decrement button).

Figure 5:
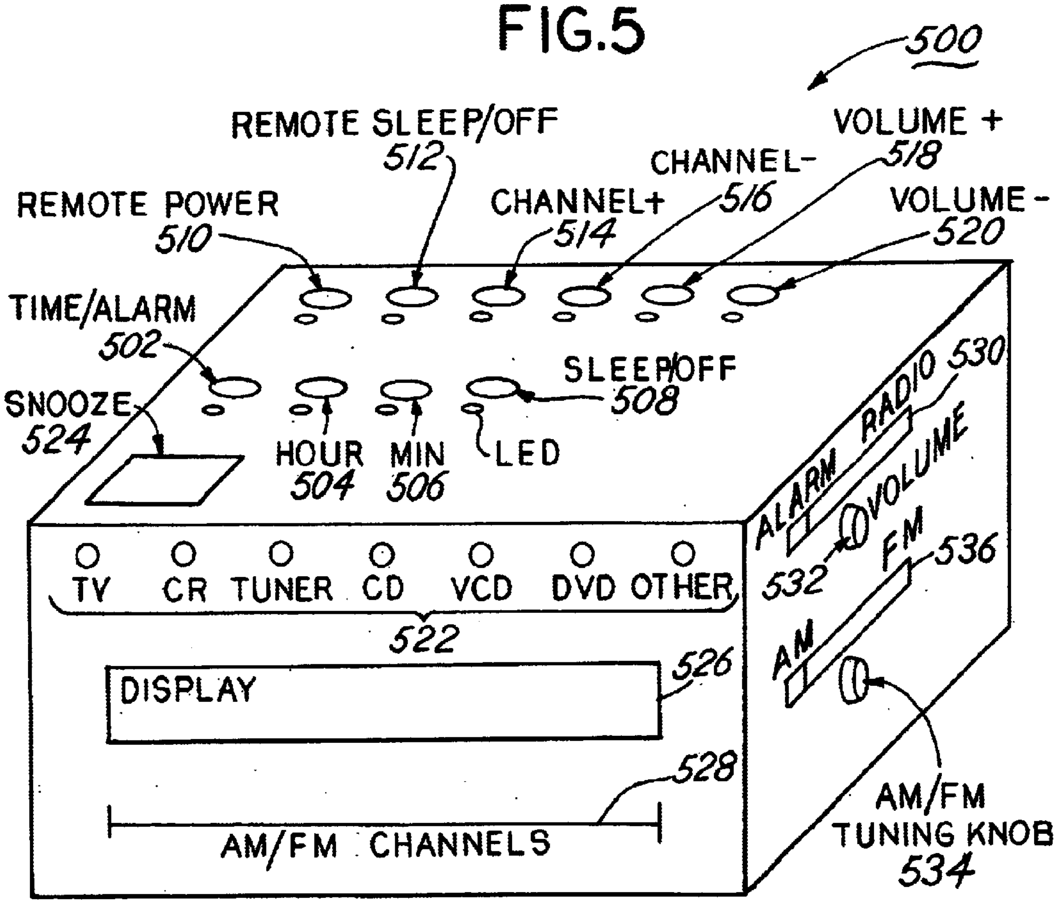
FIG. 5 is a schematic illustration of one embodiment of an alarm clock with a remote function in accordance with the present invention.

FIG. 5 is a schematic illustration of one embodiment of an alarm clock with a remote function in accordance with the present invention. The alarm clock 500 includes a time/alarm button 502 that is used to toggle between the time and alarm mode of operation. When the time/alarm button 502 is first pressed, the device enters the alarm mode. As is known in the art, the hour button 504 and minute button 506 are then used for setting the time for activation of the alarm, whereupon the display 526 shows the alarm time. In one embodiment, the alarm may include an internal buzzer or ringing alarm, AM/FM radio activation circuitry and at least one remote device alarm that may be activated as described below. The time/alarm button 502 is used to toggle the device back and forth from a current time mode to the alarm and sleep/off mode. In the time mode, the display 526 shows the current time in hours and minutes, which are adjustable using the hour button 504 and the minute button 506. In the alarm mode, the alarm activation time, radio activation time and remote device activation time may be set by the hour and minute buttons, sequentially as set forth in greater particularity below. In an alternate embodiment, upon selection of the alarm mode, the alarm activation time may be set, the time/alarm button 502 may be depressed to advance to the radio activation mode in which the radio activation time may be set, the time/alarm button 502 may be depressed again to advance to a first remote device mode in which the first remote device activation time may be set, and so forth for a predetermined number of remote device mode activations. Where desired, as shown in FIG. 5, there may be a plurality of LEDs 522, for example, aligned immediately above or next to a name of each remote device, wherein the LED for the remote device being activated or deactivated lights up.

The hour button 504 is used to change the hour setting of the current time, alarm time and/or sleep/off time. When the hour button 504 is pressed, the current hour setting is advanced by one hour. If the hour button 504 is pressed down for more than a first predetermined time, e.g., two seconds, a fast mode is entered, and the hour setting is advanced at a first predetermined rate, e.g., a rate of one hour per second.

When the minute button 506 is pressed, the minute setting of the current time, alarm time or sleep/off time may be changed, i.e., the time in minutes will be advanced one minute from the current setting. If the minute button 506 is pressed down for more than a second predetermined time, e.g., two seconds, a fast mode is entered, and the minute setting will be advanced at a predetermined rate, e.g., a rate of four minutes per second.

When the sleep/off button 508 is pressed, the sleep/off setup mode is entered. The display 526 will show the sleep/off time, and the hour button 504 and minute button 506 will be used for sleep/off time setup. When the sleep/off button 508 is pressed again, it will toggle between the sleep/off mode being ON and OFF. The process of setting the sleep/off settings follows the same scheme as shown for the alarm routine shown in FIG. 1, except that, rather than setting the alarm activation, the sleep/off activation is being set.

When the snooze button 524 is ON, the snooze button 524 stops the alarm ringer/buzzer for a predetermined time. In one embodiment, the snooze button 524 turns off the alarm ringer/buzzer for 10 minutes, after which time the alarm/buzzer and/or radio are again activated. Clearly, the predetermined time for snoozing may the manufacturer select any convenient time.

For convenience, the volume adjust knob 532 may be used to adjust the volume for either the alarm/buzzer volume or the radio volume, where the alarm/buzzer or radio may be selected using the switch 530 next to the volume adjust knob 532. The AM/FM selection switch 536 is used to select the AM or FM mode of the radio. The AM/FM tuning knob 534 for the radio channel is used to tune to the desired radio channel, as indicated on the AM/FM channels indicator 528. A remote power button 510 may be used to turn the power on and off for the remote device. The remote sleep/off button 512 may be used to set the TV or other selected remote device so that the power is shut off for the selected remote device at a preselected sleep time. In addition, a Channel + button 514 may be used to advance the channel setting for the TV (or go to a next musical selection on a CD) and a Channel – button 516 may be used to decrement a channel setting for the TV (or decrement to a prior musical selection on a CD).

When the user desires to power up a remote device, pressing the remote power and remote sleep/off buttons simultaneously will activate a remote device setup mode, or the remote device may be activated using the scheme shown in FIG. 1, which is described with more particularity below. In the remote device setup mode, the Channel + button 514, the Channel – button 516, the Volume + button 518 and the Volume – button 520 may be used for remote device selection. A combination of the Channel +, Channel –, Volume+ and Volume– buttons will form a unique code for each remote device. The remote device selection is completed by the input of the fourth code entry. Then the microprocessor will use the unique code to look up each function key code for the remote control device.

When the time/alarm button 502 is used to set the alarm to the ON mode, the microprocessor checks the current time with the alarm time. Where the current time is equal to the alarm setup time, the alarm is triggered. If the alarm mode is set to an internal alarm, i.e., a buzzer and/or radio, the internal trigger circuitry for the buzzer and/or radio will be activated. The internal alarm can be turned off by pressing the snooze button or the sleep/off button. If the alarm mode is set to activate the remote device, the remote device will be turned on by sending an infrared (IR) signal that simulates the power button, thus activating the remote device. When the remote device has been activated by the IR signal, the remote device can be turned off manually or by pressing the remote sleep/off button to activate the sleep/off process and using the hour button and minute button to set the sleep/off time.

In one embodiment, when a process is activated, an LED next to each button may light up to indicate that the button has activated a process or may be unlit to indicate that the process is inactive.

Figure 6:
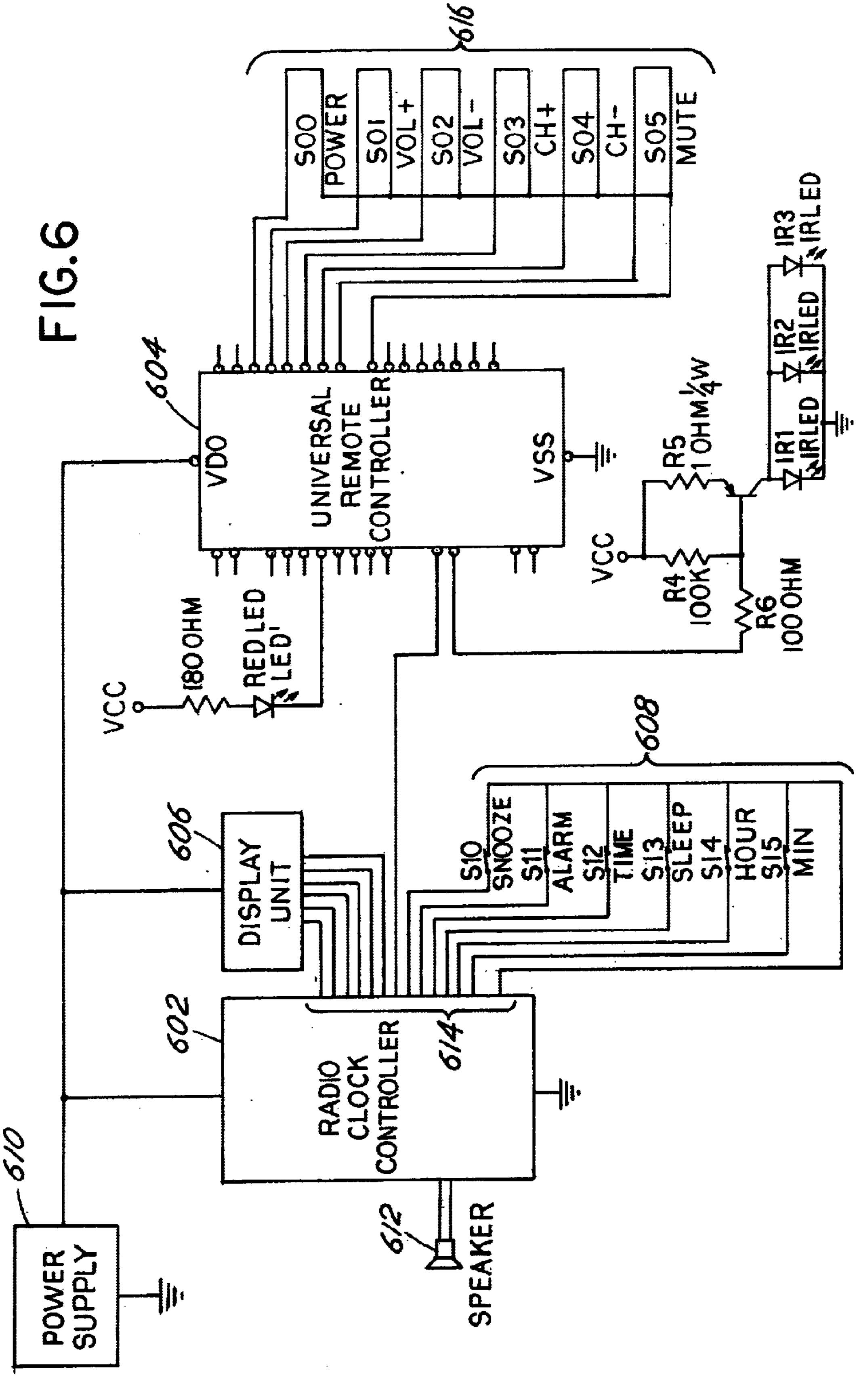
FIG. 6 is a schematic representation of one embodiment of a control switching system having two microcontroller/microprocessor units with alarm setup and activate circuitry for controlling at least one remote device.

FIG. 6 is a schematic representation of one embodiment of a control switching system having two microcontroller/microprocessor units 602, 604 with alarm setup and activate circuitry for controlling at least one remote device. The microcontroller/microprocessor unit (MCU) 602, e.g., a radio clock controller, is coupled to a display unit 606, which may, for example, be an LCD display and a power supply 610. A plurality of switches 608, which may, for example, include a snooze switch SW10, an alarm switch SW11, a time switch SW12, a sleep switch SW13, an hour switch SW14, and /or a minute switch SW15, may also be coupled to the MCU 602. Clearly, many other configurations of switches may be used. The desired switches may be selected to activate/deactivate or increment/decrement settings and devices as selected. Each of the plurality of switches is configured to be activated or inactivated by signals from the MCU 602. In this embodiment, an output from the alarm/radio controller MCU 602 is coupled to an input of the remote control MCU 604 (universal remote controller). Where the user sets up the alarm mode as a remote alarm, the remote control MCU 604 is activated, and the remote control MCU 604 looks up the preset device and sends out a power signal to activate the selected remote device. Similar to the procedure shown in FIG. 1, where the remote alarm has been set to ON 113, the universal remote microcontroller 604 determines which remote device is to be activated and sends a signal to the selected remote device to activate it. The universal remote controller 604 may also be coupled to a power supply 610 and a plurality of switches such as, for example, a power switch 900, a volume increment switch (Vol+) 901, a volume decrement switch (Vol−) 902, a channel increment switch (Ch+) 903, a channel decrement switch (CH−) 904, and/or a mute switch 905, that may be activated by the universal remote controller 604.

Thus, as shown in FIG. 6, the invention may include a remote control alarm system with circuitry including: a microprocessor/microcontroller 602 (radio clock controller), coupled to alarm activation circuitry (circuitry for 608), a speaker 612, a remote controller alarm triggering unit 604 (universal remote controller), an alarm (at switch S11), a display 606, and a plurality of input ports and output ports 614, for providing central control; the display 606, coupled to the microprocessor/microcontroller 602, for displaying at least one of: a current time and an alarm time; the speaker 612, coupled to the microprocessor/microcontroller, for outputting selected audio; the microprocessor/microcontroller 602, and alarm setup and activation circuitry 616 coupled to the remote controller alarm triggering unit 604 for setting the alarm, and activating at least one remote device of a plurality of remote devices; and wherein, the microprocessor/microcontroller 602 signals the remote controller alarm triggering unit 604 to trigger activation of one of the plurality of remote devices. Again, the display is typically a light emitting diode or an LCD display. The plurality of remote devices generally includes at least one of: a television, a video cassette recorder, an electronic device tuner, a compact disk player, a video compact disk player, a digital video/versatile disk player, and a video cassette recorder.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. An alarm clock remote control system, comprising:

alarm clock circuitry including:

a microprocessor, coupled to alarm clock activation circuitry, remote IR diode driving circuitry, an internal buzzer, an alarm, a display, and a plurality of input ports and output ports, for providing central control;

the display, coupled to the microprocessor, for displaying at least one of: a current time and an alarm time;

a speaker, coupled to the microprocessor, an AM/FM radio unit, the internal buzzer, and the alarm, for outputting selected audio;

an AM/FM radio tuner; and clock setup circuitry, alarm setup and activation circuitry coupled to the microprocessor for setting the clock, setting the alarm, and activating at least one remote device; and a programmable universal infrared remote device control, coupled to the alarm clock circuitry, for remote programming the at least one remote device, and having activation circuitry for activating the at least one remote device, wherein a remote device setup mode is activated/powered up by pressing remote power and remote sleep/off buttons simultaneously.

2. An alarm clock remote control system, comprising:

alarm clock circuitry including:

a microprocessor, coupled to alarm clock activation circuitry, remote IR diode driving circuitry, an internal buzzer, an alarm, a display, and a plurality of input ports and output ports, for providing central control;

the display, coupled to the microprocessor, for displaying at least one of: a current time and an alarm time;

a speaker, coupled to the microprocessor, an AM/FM radio unit, the internal buzzer, and the alarm, for outputting selected audio;

an AM/FM radio tuner; and clock setup circuitry, alarm setup and activation circuitry coupled to the microprocessor for setting the clock, setting the alarm, and activating at least one remote device; and a programmable universal infrared remote device control, coupled to the alarm clock circuitry, for remote programming the at least one remote device, and having activation circuitry for activating the at least one remote device, wherein a channel increment button, a channel decrement button, a volume increment button and a volume decrement button are used to provide a predetermined four part code entry that identifies a selected remote device.

3. A remote control system that includes an alarm clock system, comprising:

alarm clock circuitry including:

a microprocessor, coupled to alarm clock activation circuitry, remote IR diode driving circuitry, an internal buzzer, an alarm, a display, and a plurality of input ports and output ports, for providing central control;

the display, coupled to the microprocessor, for displaying at least one of: a current time and an alarm time;

a speaker, coupled to the microprocessor, an AM/FM radio unit, the internal buzzer, and the alarm, for outputting selected audio;

an AM/FM radio tuner; and clock setup circuitry, alarm setup and activation circuitry coupled to the microprocessor for setting the clock, setting the alarm, and activating at least one remote device; and a programmable universal infrared remote device control, coupled to the alarm clock circuitry, for remote programming the at least one remote device, and having activation circuitry for activating the at least one remote device, wherein a remote device setup mode is activated/powered up by pressing remote power and remote sleep/off buttons simultaneously.

4. A remote control system that includes an alarm clock system, comprising:

alarm clock circuitry including:

a microprocessor, coupled to alarm clock activation circuitry, remote IR diode driving circuitry, an internal buzzer, an alarm, a display, and a plurality of input ports and output ports, for providing central control;

the display, coupled to the microprocessor, for displaying at least one of: a current time and an alarm time;

a speaker, coupled to the microprocessor, an AM/FM radio unit, the internal buzzer, and the alarm, for outputting selected audio;

an AM/FM radio tuner; and clock setup circuitry, alarm setup and activation circuitry coupled to the microprocessor for setting the clock, setting the alarm, and activating at least one remote device; and a programmable universal infrared remote device control, coupled to the alarm clock circuitry, for remote programming the at least one remote device, and having activation circuitry for activating the at least one remote device, wherein a channel increment button, a channel decrement button, a volume increment button and a volume decrement button are used to provide a predetermined four part code entry that identifies a selected remote device.

* * * * *